Jan. 23, 1940.  F. T. IRGENS  2,187,973
CYCLE
Filed July 31, 1936
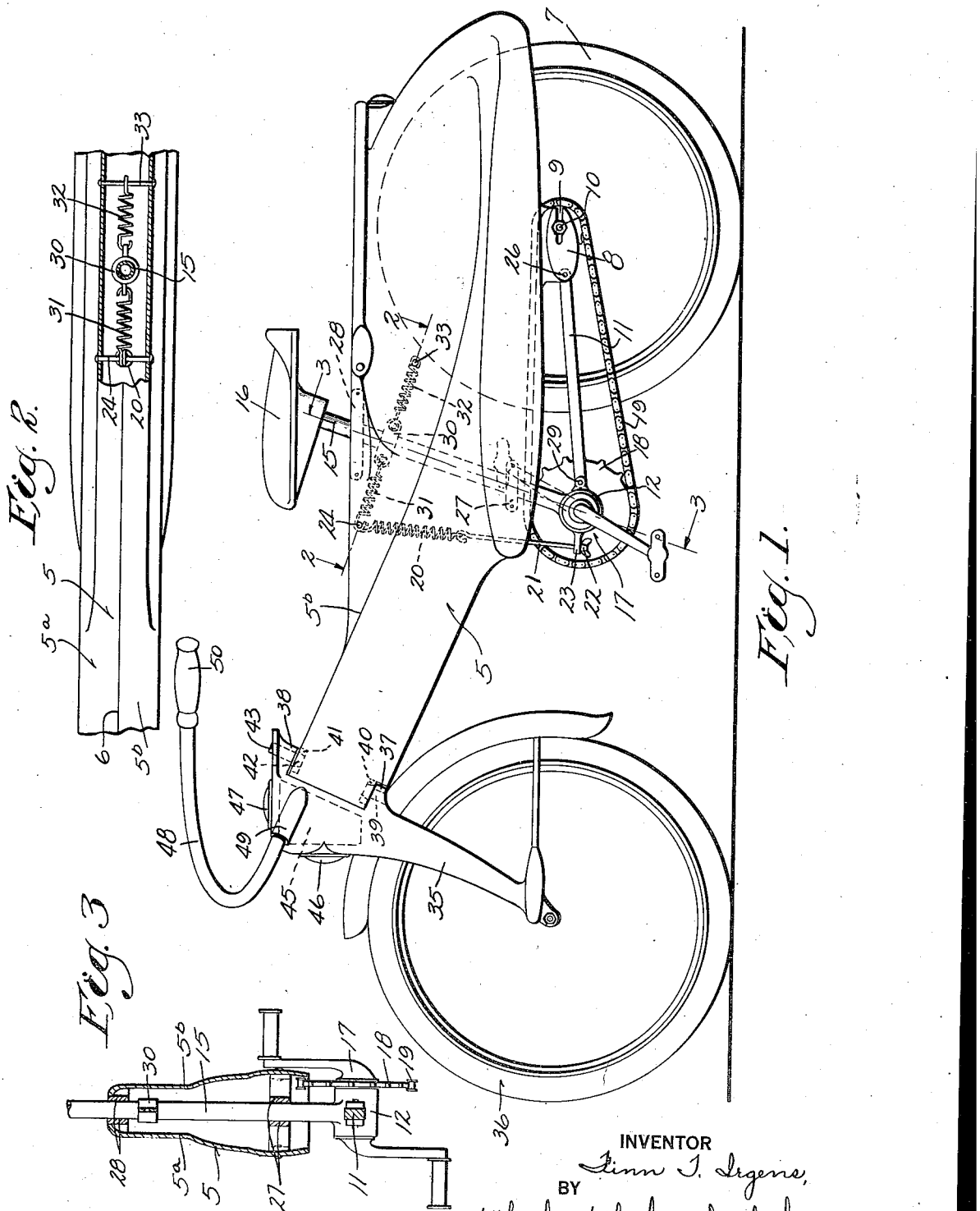
INVENTOR
Finn T. Irgens,
BY
Wheeler, Wheeler and Wheeler
ATTORNEY Patented Jan. 23, 1940

2,187,973

UNITED STATES PATENT OFFICE 2,187,973

CYCLE

Finn T. Irgens, Milwaukee, Wis., assignor to Outboard, Marine & Manufacturing Company, Wilmington, Del., a corporation of Delaware Application July 31, 1936, Serial No. 93,567

5 Claims. (Cl. 280—227)

This invention relates to improvements in cycles, and has particular reference to a bicycle construction.

It is the primary object of the invention to provide a novel and improved bicycle having easy riding characteristics and increased strength, and including a novel seat mounting and a box frame which not only encloses the upper half of the rear wheel but also encloses the upper part of the driving chain and substantially all of the yieldable seat suspension.

Other objects pertain to the construction of the frame in its relation to the front fork, the handle bars and the like, as well as to the rear wheel mounting, the seat post, and the crank hanger. My purposes will more clearly appear from the following disclosure of the invention.

In the drawing:

Figure 1 is a side elevation of a bicycle embodying my invention.

Figure 2 is a view partially in plan and partially in section on a line indicated at 2—2 in Fig. 1.

Figure 3 is a detail view in section on the line 3—3 of Fig. 1.

Like parts are identified by the same reference characters throughout the several views.

The frame 5 comprises a box including the right and left halves 5a and 5b marginally joined together by welding or otherwise, along the center line 6 except at such points as openings are required. For the sake of appearance portions of the box frame are wider than other portions, as indicated in each of the several views. The two parts 5a and 5b may readily be stamped from sheet metal in the form indicated.

The lower rear portion of the box is open to receive the rear wheel 7, and each of the component members 5a and 5b of the box is provided with an ear 8 slotted at 9 to receive the rear axle 10 in the same manner in which the rear axle is received in the conventional fork of an ordinary bicycle.

Pivoted between the ears 8 I provide a forwardly extending link 11 which at its forward end is fulcrumed to the crank hanger 12. The latter, instead of being fixed to the frame as in the usual cycle, is mounted at the lower end of a vertically yieldable seat post 15 upon which the seat 16 is rigidly mounted. The crank shaft and pedal crank assembly 17 is mounted in the hanger 12 in the conventional way, and may include a sprocket 18 for driving the rear wheel through the usual chain 19. It is particularly to be noted that the lower part of the box frame 5 serves as a guard or housing for the chain 19, the upper run of which is wholly enclosed within the frame.

The hanger 12 is supported from the upper part of the frame 5 by a tension spring 20 and a rod 21 having an adjustable wing nut connection at 22 with an ear 23 which projects forwardly from the hanger. The spring 20 is suspended on a cross bolt 24 which spans the interior of the box frame near the top thereof. The tension of spring 20 is adjusted to support the weight of the rider, and instead of providing springs in the seat I resiliently suspend the seat and seat post on spring 20 for generally vertical movement with the hanger 12, the latter being movable pivotally about the fulcrum 26 at the rear end of the connecting link 11.

In addition to the vertical resiliently permitted by spring 20, I prefer also that the seat post shall be resiliently yieldable both forwardly and rearwardly, as I find this to be of material advantage in absorbing shocks to which the rider would otherwise be subject. Accordingly I do not confine the seat post for axial movement, but merely guide it between upper and lower pairs of guide members 27 and 28 with which the frame is provided as shown in Fig. 3. The post is free for a very substantial forward and rearward pivotal movement between these pairs of guide members about the pintle 29 at the forward end of link 11. The collar 30 on the seat post is connected by tension spring 31 with the cross bolt 24 above referred to, and is connected by an opposing tension spring 32 with a rearwardly located cross bolt 33. The two springs 31 and 32 tend to maintain the seat post centered in the position illustrated in Fig. 1, but permit it to yield freely either forwardly or rearwardly so that the seat may have universal movement within the longitudinal plane of the frame. Whether the cycle wheels encounter an up-bump or a down-bump the resultant of the vertical and the horizontal components of movement permitted the seat will absorb the shock and allow the rider to pursue his course in perfect comfort.

It is particularly to be noted that regardless of the extent to which the seat may yield under shock, the distance from the seat to the hanger remains constant, and consequently the rider may continue his pedaling as if no movement had occurred. If the seat were resiliently yieldable to a corresponding extent in an ordinary cycle construction, the distance from the seat to the pedal would be materially shortened and the rider would either take the shock through his legs or would be forced into a cramped position uncomfortable for pedaling.

The front fork 35 is preferably cast unitarily, but may be assembled if desired. It mounts the front wheel 36 in a conventional manner. For pivotal connection with the frame it may be provided with rearwardly extending bearing arms 37 and 38, the former having a fixed cone bearing element co-acting with an anti-friction bearing recessed in the lower part of the frame 5 as shown at 40. A similar anti-friction bearing element is recessed in the top of the frame at 41, but the bearing cone 42 in this case is mounted in a screw 43, the turning of which permits the ready disassembly or adjustment of the parts.

An interior cavity may be provided in the fork head at 45 to receive batteries for the operation of electrical equipment such as the combination lamp and horn 46. This arrangement makes it unnecessary to employ electrical connections across any dirigible joint, since both the batteries and the electrical equipment and the leads to the horn button switch on one of the tubular handle bars near the grip can be completely assembled in a unitarily movable part. In practice there may be a speedometer instrument mounted in the steering head at 47.

Instead of being mounted in the conventional manner, the tubular handle bars 48 may be set into forwardly directed sockets 49 from which the handle bars sweep upwardly, laterally and rearwardly to the grips 50. Rotation of either handle bar in the socket will serve to adjust the height of the grip. Suitable clamps of conventional design (not shown) will hold each bar individually in adjustment. Only one handle bar and socket are illustrated, since the other corresponding bar is of like construction.

A bicycle made in accordance with this invention has exceptional strength, unique appearance, and can be ridden with ease over the roughest roads.

I claim:

1. In a cycle, the combination with a cycle frame, of a link pivotally connected therewith and extending in a general longitudinal direction, a seat post pivoted to said link for movement in a general up and down direction and for movement forwardly and rearwardly about its pivotal connection with the link, said frame including means confining said seat post against excessive lateral displacement, and means yieldably supporting the post against downward displacement and for yieldably resisting forward and rearward displacement of said post about its pivotal connection with the link, said post carrying a seat at its upper end and being provided adjacent its lower end with a crank hanger at substantially uniform spacing from the seat.

2. In a cycle, the combination with a box frame having a wheel mounting and a wheel therein partially enclosed by said frame, of a link pivotally connected with said frame adjacent said mounting and extending forwardly, a hanger connected with the link, a crank assembly mounted in the hanger and provided with driving connections to the wheel including a chain partially housed within said frame, a seat post mounted on said hanger, means providing a pivotal connection for oscillation between said post and said link, said seat post extending through the frame, a seat on said post, a supporting spring for said hanger, said post, and said link, and opposed springs acting forwardly and rearwardly upon said post adjacent the upper end thereof for resisting forward and rearward displacement of said seat, said springs being housed within said frame.

3. In a cycle, the combination with a frame, a seat, a driving wheel operatively connected to a portion of the frame, a crank in operative connection with said wheel, and a crank hanger in which said crank is journaled, of a seat post connecting the crank hanger and the seat, spring means operatively connected between the seat and the frame and adapted under load to maintain said seat normally in a predetermined position from which said seat is yieldable vertically and longitudinally of said frame, said frame being provided with means for guiding said seat for movement in a central longitudinal plane and said seat being freely movable in all directions in said plane from said position, subject only to the resilient opposition of said spring means.

4. In a cycle, the combination with a frame provided with front and rear wheels, of a link pivoted to said frame adjacent the rear wheel thereof, a crank hanger connected to said link at the forward end thereof for vertical oscillation on said link respecting said frame, a post provided at its lower end with a connection to said hanger, said hanger having means providing a pivotal connection between said post and link on which the upper end of said post is oscillatable forwardly and rearwardly of said frame, a seat carried by the upper end of the post for movement upwardly and downwardly and forwardly and rearwardly respecting said frame at a substantially fixed distance from said hanger, spring means operatively connected between the frame and post and adapted to resist the aforesaid movements of said post forwardly and rearwardly and downwardly from a predetermined central position, and means for guiding the upper end of said post respecting said frame in such movement.

5. In a cycle, the combination with a frame provided with front and rear wheels, of a crank hanger between said wheels, a link member extending rearwardly from said hanger and provided at its rear end with a pivotal connection with said frame adjacent said rear wheel, a seat post member extending upwardly from said hanger and provided adjacent its upper end with a seat, means adjacent said hanger providing a pivotal connection between said members, said hanger being secured to one of said members for vertical oscillation with said link member, said seat post member and seat being movable upwardly and downwardly with said hanger and oscillatable forwardly and rearwardly about the pivotal connection between said members, and spring means for resisting the downward, forward and backward movement of said seat post member and seat from a predetermined position, said spring means including a spring extending forwardly from said seat post member and connected forwardly thereof to said frame and another spring extending rearwardly from said seat post member and connected rearwardly thereof to said frame.

FINN T. IRGENS.